(12) United States Patent
Hansson

(10) Patent No.: US 7,647,807 B2
(45) Date of Patent: Jan. 19, 2010

(54) IN-LINE TORQUE TRANSDUCER UNIT

(75) Inventor: Gunnar Christer Hansson, Stockholm (SE)

(73) Assignee: Atlas Copco Tools AB, Nacka (SE)

( * ) Notice: Subject to any disclaimer, the term of this patent is extended or adjusted under 35 U.S.C. 154(b) by 249 days.

(21) Appl. No.: 11/795,482

(22) PCT Filed: Jan. 23, 2006

(86) PCT No.: PCT/SE2006/000085

§ 371 (c)(1),
(2), (4) Date: Oct. 29, 2007

(87) PCT Pub. No.: WO2006/078214

PCT Pub. Date: Jul. 27, 2006

(65) Prior Publication Data

US 2008/0110235 A1    May 15, 2008

(30) Foreign Application Priority Data

Jan. 21, 2005  (SE)  .................... 0500146

(51) Int. Cl.
  *G01G 19/56* (2006.01)
(52) U.S. Cl. ...................................... 73/1.12
(58) Field of Classification Search ............... 73/1.09, 73/1.11, 1.12, 862.191, 862.541, 865.6, 865.9
  See application file for complete search history.

(56) References Cited

U.S. PATENT DOCUMENTS

| 4,753,626 A | | 6/1988 | Hazebrook et al. ........... 464/140 |
| 5,383,370 A | * | 1/1995 | Abramson et al. ........ 73/862.23 |
| 5,433,548 A | | 7/1995 | Roberts et al. ................ 403/74 |
| 6,595,034 B1 | * | 7/2003 | Crane et al. .................. 73/1.12 |
| 6,629,055 B2 | | 9/2003 | McGee et al. ............... 702/151 |

FOREIGN PATENT DOCUMENTS

WO   WO 02/18895 A1   3/2002

* cited by examiner

*Primary Examiner*—Hezron Williams
*Assistant Examiner*—Tamiko D Bellamy
(74) *Attorney, Agent, or Firm*—Frishauf, Holtz, Goodman & Chick, P.C.

(57) ABSTRACT

A torque transducer unit for in-line calibration measurement of the output torque of a power wrench (S) includes a torque transferring spindle provided with a torque sensing device, two constant velocity universal joints, for instance Rzeppa-type couplings, and two coupling members for connecting the spindle at one end to the output shaft of a power wrench (S) and at the opposite end to a test joint. The spindle and the torque sensing device are protected from bending and friction related forces by the universal joints such that occurring misalignments between the power wrench (S) and the test joint do not jeopardize an accurate and reliable torque measurement.

4 Claims, 2 Drawing Sheets

IN-LINE TORQUE TRANSDUCER UNIT

This application is a U.S. National Phase application under 35 USC 371 of International Application PCT/SE2006/000085 filed Jan. 23, 2006.

The invention relates to a torque transducer unit for in-line measurement of the output torque of a power wrench having a motor driven output shaft.

A torque transducer unit of the above type is intended for power wrench calibration and test purposes, i.e. for checking the setting of the torque responsive shut-off means of the power wrench. Accordingly, this type of torque transducer is not intended to be a part of the power wrench itself, i.e. for use in production work.

Previously known in-line torque transducers for calibration and test purposes are disadvantageous in that they are formed as a rigid unit to be inserted directly between the square-ended output shaft of the power wrench and a nut socket connected to a screw joint or a test joint. This leads normally to angular and radial misalignments between the output shaft and the torque transducer as well as between the torque transducer and the nut socket. These displacements cause movements that create friction losses in the interconnection areas which result in torque losses in the transmission chain tool-transducer-screw joint. Moreover, these losses are not constant but vary over each revolution with a multiple of four for the square drive and a multiple of six for the socket-screw joint connection.

The main object of the invention is to create a torque transducer unit for in-line torque measurements of the output torque of a power wrench, wherein the output signals from the torque transducer unit are not influenced by occurring misalignments relative to the output shaft and the nut socket.

Further objects and advantages of the invention will appear from the following specification and claims.

A preferred embodiment of the invention is described below with reference to the accompanying drawings.

In the drawings

Figure 1:
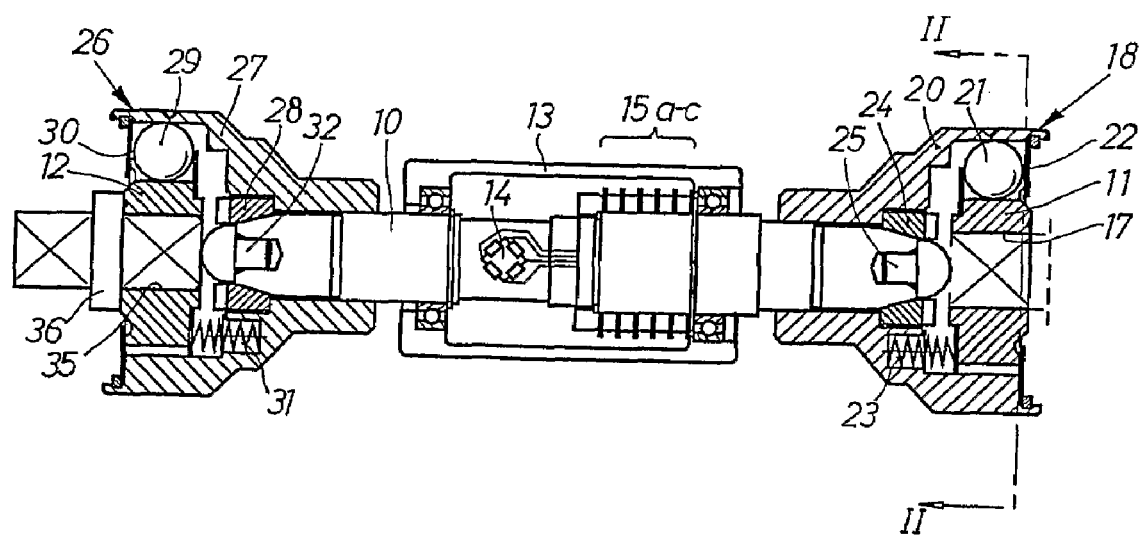
FIG. 1 shows a side view, partly in section, of a torque transducer unit according to the invention.
Figure 2:
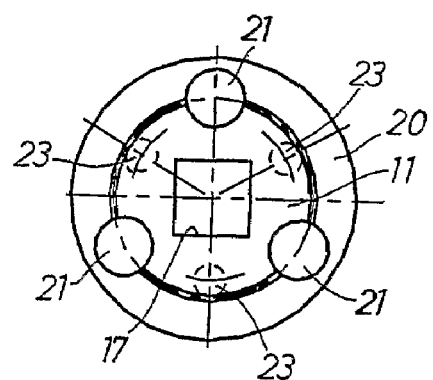
FIG. 2 shows a cross section along line II-II in FIG. 1.

The torque transducer unit illustrated in the drawings comprises a spindle 10, a first coupling member 11 disposed at one end of the spindle 10 and intended for connection of the latter to the output shaft of a power wrench S. At its opposite end the spindle 10 is provided with a second coupling member 12 for connection to a screw joint or a test joint. The spindle 10 is provided with a torque sensing means in the form of a strain gage arrangement with a bridge circuit 14 which is connected to slip rings 15 a-e. The torque sensing means is disposed in a casing 13 which is rotatively journalled on the spindle 10 and in which non-illustrated brushes are arranged to pick up signals delivered by the strain gage arrangement.

The first coupling member 11 is formed with a square opening 17 for receiving a square-ended output shaft of a power wrench S. The coupling member 11 is connected to the spindle 10 via constant velocity universal joint 18, preferably a Rzeppa-type coupling, comprising a bell shaped coupling sleeve 20 and three torque transferring balls 21 partly received in pockets in the coupling sleeve 20. The coupling member 11, which is axially supported in the coupling sleeve 20 by a steel washer 22, is also formed with pockets for partly receiving the balls 21. Three springs 23 are arranged to bias the coupling member 11 towards the steel washer 22. The coupling sleeve 20 is threaded onto the spindle 10 and locked by a conical ring screw 24. A central stud 25 forms an axial support for a power wrench output shaft when introduced in coupling member.

The second coupling member 12 is connected to the spindle 10 in the same way as the first coupling member 11, namely via a Rzeppa-type coupling 26 comprising a coupling sleeve 27, a lock screw 28, torque transferring balls 29, a steel washer 30, springs 31 and a central stud 32. The second coupling member 12 is also formed with a square opening 35 for connection to a test joint via a double-ended adapter 36.

By the arrangement according to the invention with a torque transferring spindle 10 connected at its ends to a power wrench S and a non-illustrated test joint via universal joints there is obtained that all inevitable misalignments between the power wrench output shaft and the test joint are compensated for by angular movements in the universal joints. The balls in the universal joints roll lightly relative to the friction forces in the male/female square drive connections, and occurring misalignments between the torque transmission parts are prevented from causing distortions in the signals delivered by the torque sensing means on the spindle 10. This specific type of joint with torque transferring movable balls 21,29 prevents effectively all bending and/or friction related forces from being transferred to the torque sensing means, which means that by this new torque transducer unit very reliable and accurate torque measurements are obtainable. This means in turn that the torque transducing/shut-off means of the power wrench S itself could be accurately calibrated in such a way that accurate production results of the power wrench can be guaranteed.

Figure 3A:
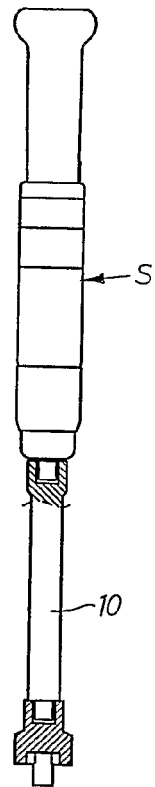
FIGS. 3A and 3B illustrate schematically a torque delivering tool and a prior art torque transducer unit in a straight position and in a misalignment position, respectively.
Figure 3B:
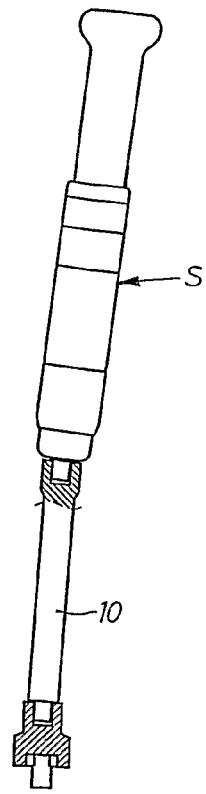
Figure 4:
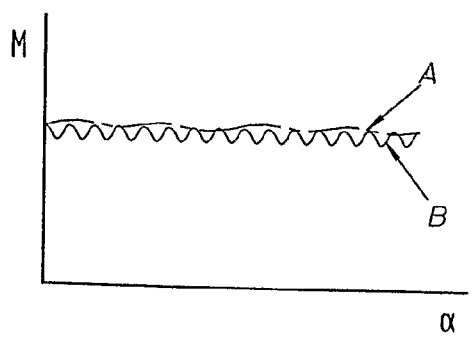
FIG. 4 shows a diagram illustrating the output torque signals from the prior art arrangement in FIGS. 3A and 3B.

In order to illustrate the improvements as regard frictional losses in the torque transmission at a torque transducer according to the invention in comparison with the prior art technique as illustrated in FIGS. 3A and 3B FIG. 4 shows a graph where torque/angle curves A and B show output signals which are uneven due to friction losses in the square drive connections. The upper curve A is less uneven because the torque transmission chain: power tool-torque transducer spindle-screw joint occupy a fairly straight position as illustrated in FIG. 3A, whereas the lower curve B is considerably uneven due to a clear misalignment in the torque transmission chain as illustrated in FIG. 3B.

Figure 3C:
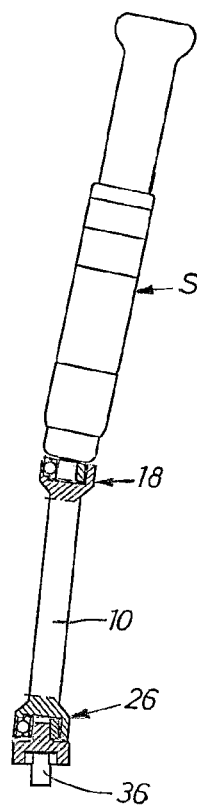
FIG. 3C illustrates a torque delivering tool and a torque transducer unit according to the invention in misaligned positions.
Figure 5:
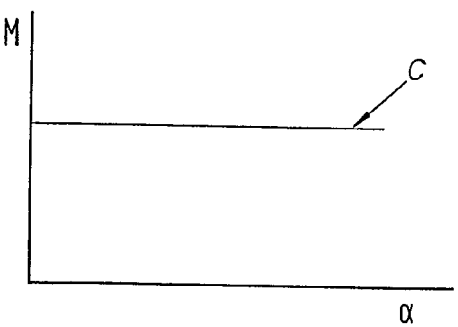
FIG. 5 shows a diagram illustrating the output torque signal curve C related to the torque transducer according to the invention as illustrated in FIG. 3C.

When using a torque transducer spindle according to the invention as illustrated in FIG. 3C occurring misalignments in the torque transmission chain are absorbed by the ball type couplings 18, 26, and the resulting torque/angle signal curve C, as illustrated in FIG. 5, will still be a straight line.

It is to be understood that the above described device is just an example and that the embodiments of the invention can be varied within the scope of the claims. For instance, the torque sensing means does not have to be of the strain gage type but could be of any suitable type like a inductive/magnetostrictive type.

The invention claimed is:

1. Torque transducer unit for in-line calibration measurement of the output torque of a power wrench (S) having a motor driven output shaft, the torque transducer unit comprising:
   a torque transferring spindle provided with a torque sensing device,
   a first coupling member for connection to the power wrench output shaft,
   a second coupling member for connection to a test joint, and
   a constant velocity universal joint coupling said spindle to each one of said first and second coupling members for absorbing occurring misalignments between the power wrench output shaft, the spindle and the test joint.

2. A torque transducer unit according to claim 1, wherein said universal joint is of the Rzeppa-type coupling and includes torque transferring rolling elements.

3. A torque transducer unit according to claim 2, wherein said torque sensing device comprises a strain gage sensor attached to the spindle.

4. A torque transducer unit according to claim 1, wherein said torque sensing device comprises a strain gage sensor attached to the spindle.

* * * * *